United States Patent [19]

Richardson et al.

[11] 4,318,895
[45] Mar. 9, 1982

[54] PROCESS FOR GENERATING SINGLET-OXYGEN

[75] Inventors: Ralph J. Richardson, Ballwin; Harvey V. Lilenfeld, St. Louis, both of Mo.

[73] Assignee: McDonnell Douglas Corporation, Long Beach, Calif.

[21] Appl. No.: 90,929

[22] Filed: Nov. 5, 1979

[51] Int. Cl.$^3$ .......................................... C01B 13/00
[52] U.S. Cl. .................................. 423/579; 422/231; 372/55
[58] Field of Search ................... 423/579; 331/94.5 G

[56] References Cited

U.S. PATENT DOCUMENTS

| | | | |
|---|---|---|---|
| 3,970,738 | 7/1976 | Matsui et al. | 423/632 |
| 3,980,762 | 9/1976 | Shiblom, Jr. et al. | 423/579 |
| 4,102,950 | 7/1978 | Pilipovich et al. | 423/579 |
| 4,246,252 | 1/1981 | McDermott et al. | 423/579 |

OTHER PUBLICATIONS

Benard et al., "Applied Physics Letters", vol. 34, pp. 40 and 41, (Jan. 1, 1979).

*Primary Examiner*—O. R. Vertiz
*Assistant Examiner*—Wayne A. Langel

*Attorney, Agent, or Firm*—George W. Finch; Donald L. Royer; John P. Scholl

[57] ABSTRACT

A process and apparatus are provided for producing singlet molecular oxygen, $O_2(^1\Delta)$. A nitrogen containing base such as $NH_3$, diethylamine, ethanolamine, propylamine, triethylene diamine, phenethylamine, methyl amine, or dipropylamine is mixed with hydrogen peroxide. Chlorine gas is bubbled through the mixture which reacts therewith to produce singlet molecular oxygen. A preferred embodiment of the reaction is illustrated by the following example:

$$2RNH_2 + H_2O_2 + Cl_2 \rightarrow O_2(^1\Delta) + 2RNH_3Cl$$

where $RNH_2$ is an amine.

The apparatus for producing the singlet molecular oxygen is a reactor vessel with the hydrogen peroxide and nitrogen containing base solution as a liquid mixture in the bottom thereof through which chlorine gas is bubbled. The vessel is maintained at a pressure range of 1 to 20 Torr, a temperature range of $-30°$ to $35°$ C., a pH range of 7 to 12, and the $O_2(^1\Delta)$ is drawn off the vessel through a suitable vent.

9 Claims, 1 Drawing Figure

U.S. Patent
Mar. 9, 1982
4,318,895
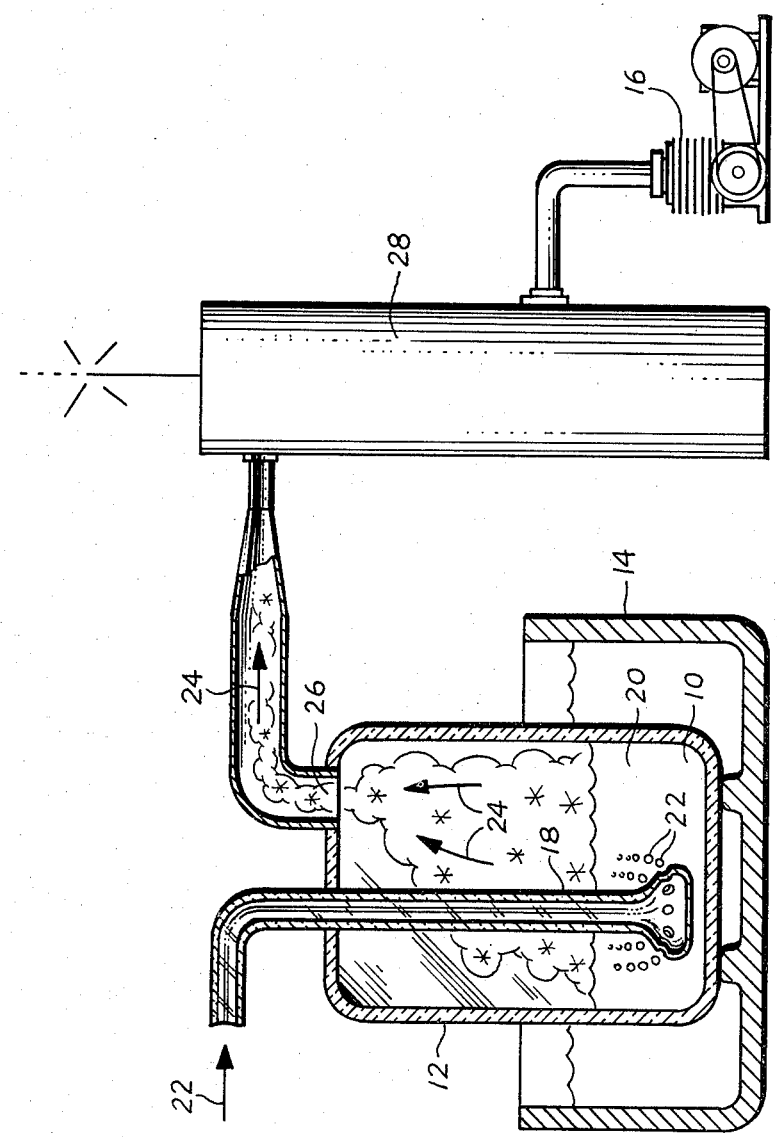

PROCESS FOR GENERATING SINGLET-OXYGEN

BACKGROUND OF THE INVENTION

Molecules such as $O_2$ can exist in different energy states depending upon the arrangement of the electrons about the nucleus. When the energy state of the molecule is above its usual ground state it is said to be in an excited state. One of the excited states for the oxygen molecule is the singlet molecular oxygen state generally identified by the symbol $O_2(^1\Delta)$ or by the abbreviation $O_2^*$.

Singlet molecular oxygen has utility when it is transferred to atomic iodine to produce a lasing species as discussed in Benard et al., "Applied Physics Letters," Vol. 34, pp. 40-43, 1979 and Richardson et al., "Applied Physics Letters," Vol. 35, pp. 138-139, 1979. An iodine laser that uses $O_2^*$ has potential application as a very high energy chemical laser which would have significant advantages over existing lasers as a result of the short wavelength (1.315 $\mu$m) for the iodine laser. $O_2^*$ also is useful as a synthesizing reagent for making organic compounds and lately has been extensively studied because it is believed to be an important intermediate in many biological functions including biological defense against infection.

Early attempts at producing $O_2^*$ are reported in Kearns, "Chemical Reviews," Vol. 71, No. 4, pp. 395-411 and Foote et al., "J. Am. Chem. Soc.", Vol. 90, pp. 975-981, 1968, Shiblom, Jr., et al., U.S. Pat. No. 3,980,762 and Pilipovich et al., U.S. Pat. No. 4,102,950. Shiblom Jr, et al discloses an $O_2^*$ generator whose yield can be approximated by the amount of $O_2^*$ in natural oxygen in equilibrium with a hot reactor, whereas Pilipovich reacts a hypohalite selected from the group consisting of $BrSO_3F$, $BrNO_3$, $BrOCF_3$, $ClSO_3F$, $ClNO_3$, $ClOCF_3$, $FSO_3$, $FOCF_3$, and $ISO_3F$, with hydrogen peroxide. Unfortunately, some of the hypohalites present stability problems which make their use difficult and some are extremely toxic.

$O_2^*$ has also been chemically generated with aqueous $H_2O_2$ and $Ca(OCl)_2$. Such a method is not suitable for the gas phase generation of $O_2^*$ because the yields are low and the reagents are both solid and liquid making efficient mixing, feed control, and reactor control difficult to obtain.

The most successful method of producing $O_2^*$ involves $Cl_2$, $H_2O_2$ and $NaOH$ as discussed in Benard, et al, and Richardson, et al, referenced above. However, NaOH is not sufficiently soluble in $H_2O_2$—$H_2O$ mixtures to permit utilization of significant percentages of the $H_2O_2$ in the $O_2^*$ generator. In addition, the quantity of NaCl produced in the reaction is not soluble in the $H_2O_2$—$H_2O$ mixture and the solid NaCl that is formed is deleterious to the operation of the generator.

BRIEF DESCRIPTION OF THE INVENTION $O_2^*$ is produced by mixing hydrogen peroxide and a nitrogen containing base solution such as $NH_3$, phenethylamine, ethanolamine, diethylamine, propylamine, triethylene diamine, methyl amine, or dipropylamine to maintain a basic solution of hydrogen peroxide through which chlorine gas is bubbled. The presence of the base causes a proton to transfer from the $H_2O_2$ $$H_2O_2 + RNH_2 \rightarrow HO_2^- + RNH_3^+.$$

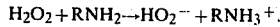

The $Cl_2$ and $HO_2^-$ then react to form $O_2^*$ and $HCl + Cl^-$. The HCl is subsequently neutralized by the base. Although only a primary amine is indicated, the same process occurs with secondary $R_2NH$ and tertiary $R_3N$ amines. This process occurs in a pressure range of 1 to 20 Torr, a temperature range of $-30°$ to $35°$ C., and a pH range of 7 to 12.

Several of the nitrogen-containing bases (phenethylamine, ethanolamine, propylamine) are completely miscible with 90% by weight $H_2O_2$ without catalyzing catastrophic decomposition of the $H_2O_2$ and do produce comparable percentages of $O_2^*$ as does the $O_2^*$ generator utilizing NaOH. In addition, this process does not produce $H_2O$. This is an advantage since the $H_2O$ must be removed by a water vapor trap in the NaOH generator.

It is therefore an object of the present invention to provide means for generating $O_2^*$ which can produce a high concentration thereof over a relatively long period by utilizing all of the $H_2O_2$ in the reactor.

Another object is to provide an improved method for generating $O_2^*$.

Another object is to provide an $O_2^*$ generation system which produces the $O_2^*$ in a form useful in iodine lasers.

These and other objects and advantages of the present invention will become apparent to those skilled in the art after considering the following detailed description in conjunction with the accompanying drawing wherein:

BRIEF DESCRIPTION OF THE DRAWING

The FIGURE is a schematic of a generator for producing $O_2^*$ according to the present invention.

DETAILED DESCRIPTION OF THE PREFERRED EMBODIMENTS

It has been discovered that a variety of nitrogen containing bases such as $NH_3$, ethanolamine, diethylamine, propylamine, triethylene diamine, methyl amine, and dipropylamine can be used to maintain a basic solution of hydrogen peroxide during an $O_2^*$ generation process in which chlorine gas is introduced to dissociate the hydrogen peroxide into $O_2^*$. These reactions can be represented as follows:

$$2RNH_2 + Cl_2 + H_2O_2 \rightarrow O_2^* + 2RNH_3Cl$$

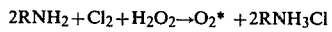

where $RNH_2$ is a nitrogen containing base such as $NH_3$, ethanolamine, diethylamine, propylamine, triethylene diamine, methyl amine, and dipropylamine.

The reactions represented by the above equation are improvements over prior methods of generating $O_2^*$ in that they yield 30% $O_2^*$ which is high enough in concentration to emit visible red chemiluminescence that readily can be discerned, which is the result of the cooperative emission of a single photon with wavelength 634 nm from two $O_2^*$ molecules that collide. This phenomenon is discussed in the Kearns review. The nitrogen containing bases are superior as bases to the common sodium hydroxide since they are less reactive with the hydrogen peroxide, some being premixable with the hydrogen peroxide in stoichiometric amounts, and their chloride salts are generally more soluble in the hydrogen peroxide solution that results during the generation process which improves the system aspects of a laser in which the $O_2^*$ is used. They are more likely to act as a buffer solution by maintaining the pH of the generator solution during a relatively long generation process and thus improve the yield from the generator.

The following nonlimiting examples illustrate the invention:

EXAMPLE 1

$$2CH_3CH_2CH_2NH_2 + H_2O_2 + Cl_2 \rightarrow O_2^* + 2CH_3CH_2CH_2NH_3Cl$$

EXAMPLE 2

$$2NH_3 + H_2O_2 + Cl_2 \rightarrow O_2^* + 2NH_4Cl$$

EXAMPLE 3

$$2OHCH_2CH_2NH_2 + H_2O_2 + Cl_2 \rightarrow O_2^* + 2OHCH_2CH_2NH_3Cl$$

EXAMPLE 4

$$2(CH_3CH_2CH_2)_2NH + H_2O_2 + Cl_2 \rightarrow O_2^* + 2(CH_3CH_2CH_2)_2NH_2Cl$$

The example processes occur in a pressure range of 1 to 20 Torr, a temperature range of $-30°$ C. to $35°$ C, and a pH range of 7 to 12.

Features of a generator for practicing the method of the present invention are described in the following detailed description taken with reference to the accompanying drawing. The selected nitrogen containing base is mixed in liquid form with the hydrogen peroxide at the bottom 10 of a reaction vessel 12. The heat of solution is removed either by a cooling bath 14 or forced evaporation utilizing a vacuum pump 16 to prevent the $H_2O_2$ from reaching a temperature of $50°$ C., which could cause catastrophic autodecomposition of the $H_2O_2$. A bubbler 18 is inserted into the mixture 20 and chlorine gas 22 is bubbled therethrough. This causes the decomposition of the hydrogen peroxide in the fluid mixture 20 and the $O_2^*$ 24 produced is vented though an outlet 26 for use by transfer to atomic iodine to fuel a high energy laser 28 with a wavelength of 1.315 $\mu$m. The vacuum pump 16 is provided downstream of the outlet 26 to evacuate the system prior to starting the reaction and to maintain the desired pressure therein. The percentage of $O_2^*$ generated by this method has been compared to the method utilizing NaOH by monitoring the signal from an intrinsic Ge detector which detects the radiative decay of $O_2^*$ at 1.27 $\mu$m which is proportional to the $O_2^*$ concentration. This percentage has been shown to be 30% utilizing Electron Spin Resonance Spectroscopy.

Therefore, there has been shown and described novel processes and apparatus for producing $O_2^*$ which fulfill all of the objects and advantages sought therefore. Many changes, modifications, variations, and other uses and applications of the subject invention will become apparent to those skilled in the art after considering the foregoing detailed specification together with the drawing. All such changes, modifications, variations and other uses and applications which do not depart from the spirit and scope of the invention are deemed to be covered by the invention which is limited only by the claims which follow.

What is claimed is:

1. A process for generating $O_2^*$ including the steps of:
   placing $H_2O_2$ in a reactor vessel;
   maintaining the reactor vessel at a pressure of 1 to 20 Torr and a temperature of $-30°$ to $35°$ C.;
   maintaining the $H_2O_2$ in the reactor vessel at a pH of 7 to 12 with a nitrogen containing base; and
   bubbling chlorine gas through the $H_2O_2$ in the reactor vessel.

2. The process as defined in claim 1 wherein the nitrogen containing base is an amine.

3. The process as defined in claim 2 wherein the amine is chosen from the group consisting of:
   $NH_3$;
   ethanolamine;
   diethylamine;
   propylamine;
   triethylene diamine;
   methyl amine; and
   dipropylamine.

4. The process as defined in claim 1 including the additional step of:
   collecting the $O_2^*$ generated through a vent in the reaction vessel.

5. A process for generating $O_2^*$ including the steps of:
   reacting $H_2O_2$ with $R_{(x)}NH_{(y)}$ as follows $$H_2O_2 + R_{(x)}NH_{(y)} \rightarrow HO_2^- + R_{(x)}NH_{(y+1)}^+$$

where $R_{(x)}NH_{(y)}$ is at least one amine; and
   reacting $Cl_2$ with the $HO_2^-$ to form $O_2^*$.

6. The process as defined in claim 5 wherein the at least one amine is chosen from the group consisting of:
   $NH_3$;
   ethanolamine;
   diethylamine;
   propylamine;
   triethylene diamine;
   methyl amine; and
   dipropylamine.

7. The process as defined in claim 6 wherein said reaction takes place at a pressure of 1 to 20 Torr.

8. The process as defined in claim 6 wherein said reaction takes place at a temperature of $-30°$ to $35°$ C.

9. The process as defined in claim 5 wherein said reaction takes place at a pressure of 1 to 20 Torr and a temperature of $-30°$ to $35°$ C.

* * * * *